United States Patent [19]

Chouinard

[11] Patent Number: 4,660,841
[45] Date of Patent: Apr. 28, 1987

[54] HAND TIGHTENABLE DEVICE FOR HOLDING A CUTTING IMPLEMENT

[76] Inventor: Michael J. Chouinard, 88 Milton St., Milton, Mass. 02186

[21] Appl. No.: 691,443

[22] Filed: Jan. 14, 1985

[51] Int. Cl.$^4$ .................. B23B 31/00; B23B 5/22
[52] U.S. Cl. .................. 279/61; 279/1 B; 279/63
[58] Field of Search .............. 279/1 K, 1 ME, 60, 61, 279/62, 63, 64, 65, 1 R, 1 B

[56] References Cited

U.S. PATENT DOCUMENTS

| | | | |
|---|---|---|---|
| 323,179 | 7/1885 | Mason | 279/61 |
| 323,181 | 7/1885 | Mason | 279/61 |
| 833,351 | 10/1906 | Townsend | 279/1 K |
| 2,387,339 | 10/1945 | Meyer | 279/61 |
| 3,044,790 | 7/1962 | Stoner | 279/1 K |
| 3,807,745 | 4/1974 | Bent | 279/62 |
| 4,395,170 | 7/1983 | Clarey | 279/1 K |

OTHER PUBLICATIONS

Brookstone Catalog Entry, p. 27, Item Numbers F-09890 and F-09911 Which Pictures a ¼" Hex Shank.
Brookstone Catalog Entry, p. 22, Item Number F-01114 Which Pictures an Adapter Chuck for Tiny Drills.
Sears Owners Manual for the Craftsman ⅜" Electronic Drill (Model Number 315.10300) Which is Believed to Mention (at p. 44) an "Auto Chuck".

Primary Examiner—Gil Weidenfeld
Assistant Examiner—Gary F. Paumen
Attorney, Agent, or Firm—Lahive & Cockfield

[57] ABSTRACT

A hand tightenable chuck for holding a cutting implement in place has been developed. The chuck uses two screw systems to achieve the proper degree of tightness; a first system providing a coarse tightening or pinching of the shaft and a second providing a clamping action. The combination of screw systems eliminates the need for the key used to tighten conventional chucks.

9 Claims, 5 Drawing Figures

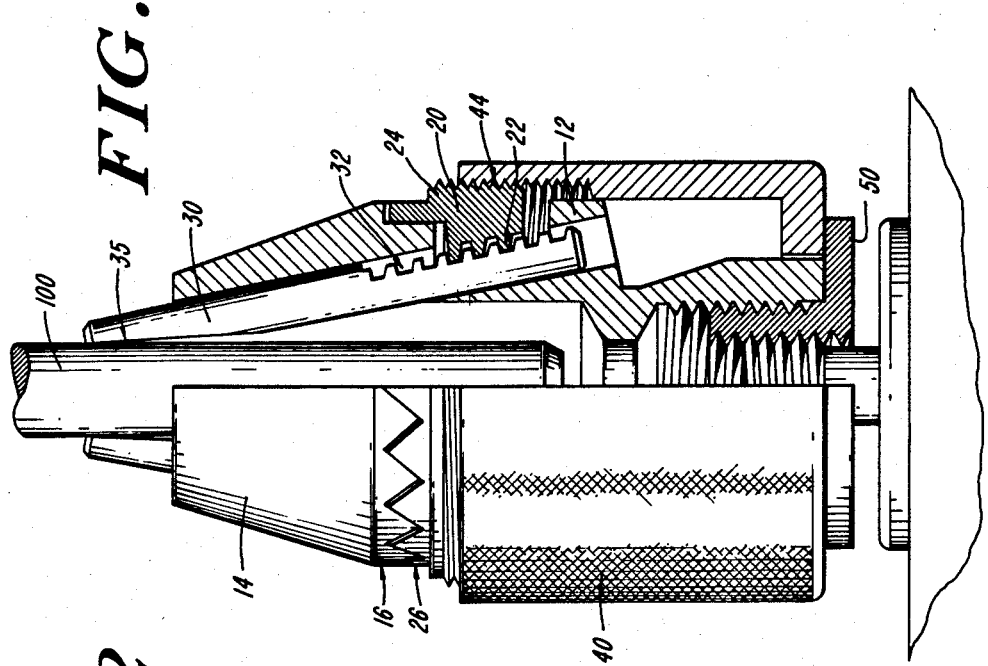
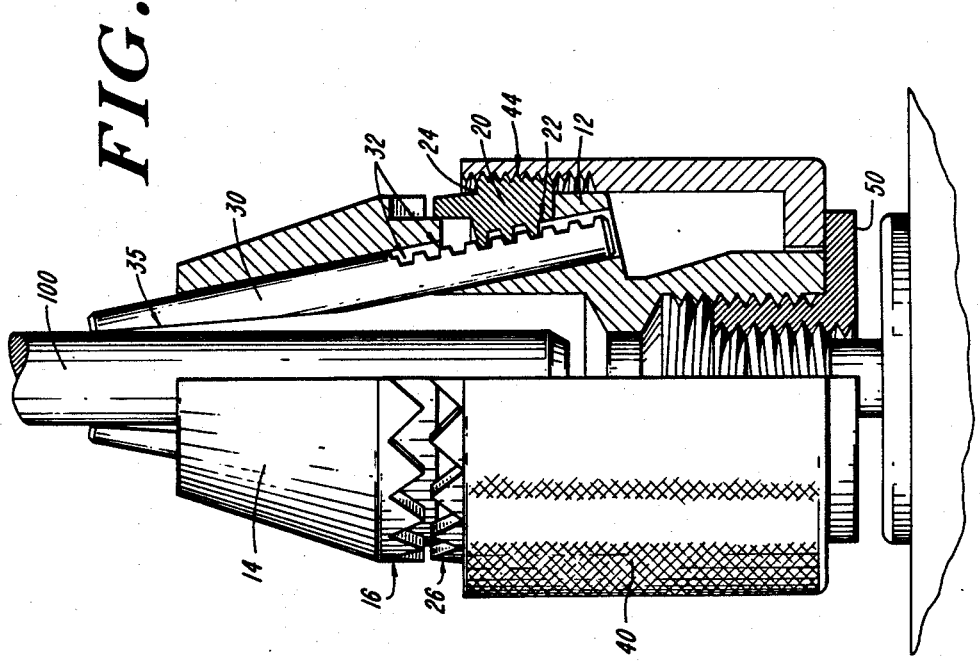

HAND TIGHTENABLE DEVICE FOR HOLDING A CUTTING IMPLEMENT

BACKGROUND OF THE INVENTION

The present invention relates to devices for holding or clamping cutting implements in a fixed position. The device of the invention eliminates the need for an additional mechanical apparatus, e.g., a key, to tighten the clamping devise about the cutting implement.

Rotational cutting implements e.g., drill bits, must be held firmly, e.g., clamped, in place to achieve proper cutting. This clamping is necessary because cutting causes an associated torque on the bit. Drill chucks are designed to lock the drill bit in place by creating sufficient frictional force between the engaging members and the bit shaft so that this torque does not produce rotation of the bit. In conventional drill chucks, one cannot lock cutting implements in place completely by hand tightening so a further mechanical aid, such as a key, is required to tighten the chuck. This mechanical aid supplies an additional mechanical advantage which allows the user to supply more torque.

Most drill chucks and other devices for holding cutting implements in place use a three member clamp or pinching system. Normally, there are three engaging members, each of which has a set of threads on its exterior surface. This threaded screw forms part of a threaded clamping device when mated with an additional set of threads on the interior surface of an encircling yoke.

The yoke has a coarsely pitched thread, matching the thread on the engaging members, on the interior surface so turning the outer portion of the drill chuck cause the yoke to turn, thereby raising the engaging members inwardly toward the bit shaft. A key is then used to further tighten or clamp the engaging members which locks the bit in place. The key acts on the lever principle and supplies the mechanical advantage necessary for clamping the bit by the chuck. This holds the bit in place without loosening as tortional forces are created during drilling. Without the key, the necessary degree of tightness is not possible in conventional chucks. However, these keys are often lost, leaving the user no method of tightening the drill chuck. To prevent loss, keys are often attached to the cord of the drill, a procedure which is potentially hazardous. A further hazardous condition may result if the drill is activated before the key is removed from the chuck.

Some hand tightenable drill chucks are presently available, e.g., a chuck manufactured by Albrecht of West Germany. These drill chucks use a somewhat finer thread having a higher mechanical advantage than conventional drill chucks but work substantially on the same principle; a single thread drives the clamping members against the bit. To achieve the necessary degree of tightness, the parts of the chuck are finely machined so that the chucks become prohibitively expensive for home or light industry use. In fact, these finely machined chucks can cost twice the cost of a total conventional drill.

Hexagonal shank drill bits require a lesser degree of tightening than conventional cylindrical bits because of their shape but lack accuracy in the drilling and can wobble loose in use. There are also minidrill chucks used for small instruments such as dental drill bits which are entirely hand tightenable but these chucks also use a conventional single thread system. These mini chucks work because they do not require the high degree of tightness in operation.

Another way of achieving sufficient tightness on a drill bit without using a key is the use of a collet. However, one must change the collet for each different diameter drill shaft; that is, each collet is limited to use with a single size drill shaft. Therefore, use of collets are labor intensive and time consuming.

Accordingly, an object of the invention is to provide a device for holding a cutting implement in position, e.g., a drill chuck, which is hand tightenable without use of any additional mechanical devices while being compact and easy to use. Another object is to provide an inexpensive method of locking rotating cutting implements in position by hand. A further object is to eliminate keys for drill chucks. These other objects and features of the invention will be apparent from the following description and the drawing.

SUMMARY OF THE INVENTION

Broadly, the invention features an apparatus or chuck for holding a cutting implement in a fixed position relative to a motor or other drive which is hand tightenable without the aid of any additional mechanical devices. The chuck provides two tightening stages rather than the conventional single stage; a first tightening stage provides a rough tightening or pinching of the cutting implement while the second tightening stage provides a clamping or final tightening. These two stages work in concert to clamp the cutting implement in place. The invention also features the method of locking a cutting implement in place without a key.

More particularly, the apparatus includes a clamping member adapted to hold a cutting implement in a fixed position relative to the drive which is tightened by a two stage system. The first tightening stage, which provides the pinching of the cutting implement or bit, and a second tightening stage, which provides the clamping, form first and second threaded screw systems, respectively. One of these systems, normally the second threaded screw system, provides a higher mechanical advantage than the other. The apparatus also includes an enclosing member or can which is exterior to the first and second tightening devices.

The clamping member includes a yoke and a plurality of engaging members. Each engaging member has a first surface which engages the cutting implement upon pinching of the clamping member and clamps the cutting implement upon further tightening. Each engaging member has a first set of substantially coarse threads on its second surface, the surface opposite the first surface. The yoke, which surrounds the engaging members, has interior and exterior surfaces. The interior surface of the yoke has a second set of substantially coarse threads located to intermesh with the first set of substantially coarse threads on the engaging members and form the first threaded screw system. The yoke also has a first set of substantially fine threads on its exterior surface while the enclosing member has a second set of substantially fine threads on its interior surface. These first and second sets of substantially fine threads intermesh to form the second threaded screw system. The apparatus also includes a head member having a plurality of channels therethrough. Each of the channels is adapted to permit passage of one of the engaging members so that upon tightening of the apparatus, the engaging members slide inwardly up the channels and engage the cutting implement. The head member also includes a first set of interlocking members located on the outer edge adjacent to the yoke while the yoke includes a second set of interlocking members adapted to engage the first set of interlocking members when the apparatus is undergoing the second clamping stage to its clamped, fully tightened position. The interlocking members are constructed and located such that the first threaded screw system cannot operate upon loosening of the apparatus until the second threaded screw system is fully loosened.

The invention also features a method of tightening a drill chuck on a drill bit by hand without use of an additional mechanical device. This method entails the steps of providing a drill chuck with a plurality of engaging members, each engaging member having an engaging surface and a drive surface. The drive surface has a first set of substantially coarse threads. The drill chuck includes a yoke having interior and exterior surfaces, the yoke having a second set of substantially coarse threads on its interior surface positioned to intermesh with the first set of substantially coarse threads on the drive surface. This yoke also has a first set of substantially fine threads on its exterior surface as well as a first set of intermeshing members.

An enclosing member or can adapted to enclose the yoke and engaging members is also provided. The enclosing member has interior and exterior surfaces with a second set of substantially fine threads on the interior surface positioned to intermesh the first set of substantially fine threads on the yoke. A head member, which has a plurality of channels to permit passage of the engaging members, is provided. The head member has a second set of interlocking members adapted to engage the first set of interlocking members on the yoke when the yoke is forced toward the head during tightening of the drill chuck.

A bit or other cutting implement is placed between the plurality of engaging members and the engaging members are tightened about the bit by turning the enclosing member. Upon turning the enclosing member, the first and second set of substantially coarse threads form a first tightening system which moves the engaging members until a coarse tightening or pinching of the bit is achieved. The chuck is constructed so that the frictional force encountered in turning the fine threads is greater than the frictional force on the coarse threads until this pinching occurs. Therefore, the coarse threads turn first in the free or disengaged state. Once pinching is achieved, the coarse thread is no longer operative to tighten the engaging members about the bit due to the sudden increase in necessary tightening force once the bit shaft is engaged by the engaging members. The changeover from the coarse thread turning to turning of the fine thread occurs when the torque necessary to tighten the coarse threads becomes higher than necessary to turn the fine threads. At this stage, the fine threads turn since a lower force is required. The chuck is then clamped about the drill shaft by the action of the fine thread. This fine thread pushes the yoke upward which forces the engaging members upward thus causing further surface contact and additional friction with the bit. The upward movement of the yoke in response to the action of the fine thread causes a slight disengagement of the coarse thread. The added force and friction caused by the final inward motion of the engaging members while sliding up the channels locks the engaging members about the bit.

In another embodiment, the drill chuck for holding a drill bit is a double screw system each of which is engaged separately by turning the yoke or an enclosing member. More specifically, the drill chuck includes a plurality of engaging members each having a first surface adapted to engage the drill bit upon pinching of the clamping member and a second surface having a first set of substantially coarse threads. A yoke having a second set of coarse threads on its interior surface is located so that the first and second sets of coarse threads intermesh, forming a first threaded screw system. The yoke may have knurled threads on its exterior surface. The yoke is turned which drives the first threaded screw system and, thereby, the engaging members to the pinching position.

This embodiment also includes an enclosing member exterior to a portion of the central body of the chuck. The enclosing member has interior and exterior surfaces and two ends. One end of this enclosing member is positioned adjacent to the yoke and has a first fine thread on the interior surface of its opposite end. The central body has a plurality of channels therethrough which permit passage of the engaging members and a second fine thread adapted to engage said first fine thread to form the second threaded screw system. The enclosing member is turned to provide the clamping of the engaging members about the drill bit by forcing the yoke upward, forcing the engaging members upward and inward towards the shaft of the drill bit.

The dual threaded screw system of this invention permits hand tightenability of the drill chuck. The first screw system always forms a coarse tightening by turning the yoke. The second screw system forces the yoke upward resulting in an upward and inward action of the engaging members clamping the drill bit in place. This upward and inward action lifts the yoke thereby partially disengaging the threads of the first system. The force caused by the upward and inward action of the engaging members causes additional surface contact with the drill shaft, forming a stronger hold on the shaft by the drill chuck, creating the final clamping action.

BRIEF DESCRIPTION OF THE DRAWING

FIG. 2 is a cross sectional drawing of the drill chuck of FIG. 1 in an untightened position;

FIG. 3 is a cross section of the drill chuck of FIG. 1 showing the drill chuck clamped about a drill bit;

DESCRIPTION OF THE ILLUSTRATED EMBODIMENTS

The present invention features an apparatus and method for holding a cutting implement in a fixed position relative to a drive. The apparatus and method of the invention permit the locking of a cutting implement in place by hand without the need for an additional mechanical device such as a key. Conventional home and light industry drills require a lever-like key for tightening the chuck about the drill bit. These keys can be lost or misplaced which makes the drill as a whole useless. A safety hazard can arise if the key is not taken out of the chuck before operation of the drill. The key can be thrown, injuring the drill user or bystanders. The present invention eliminates these problems.

Figure 1:
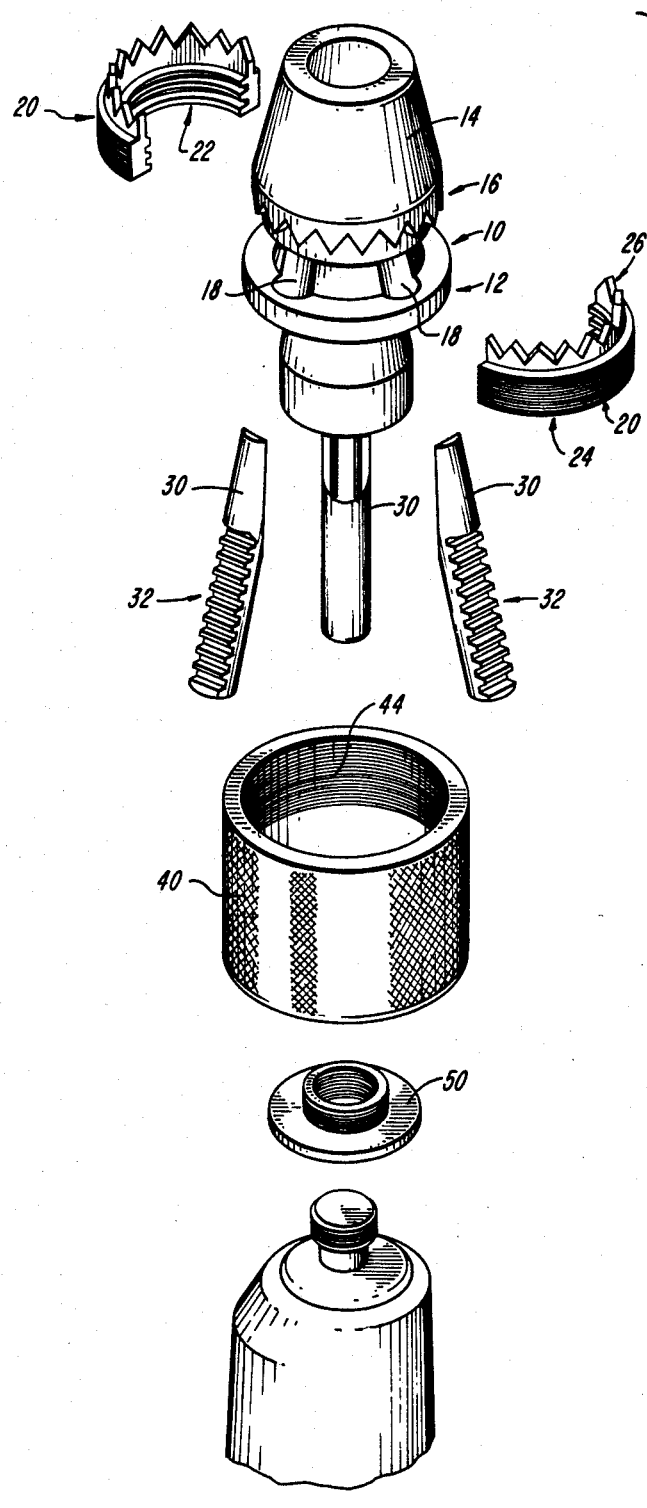
FIG. 1 is a breakout drawing of a drill chuck of the invention.

Turning to the figures, FIG. 1 illustrates a drill chuck of the present invention. The drill chuck has a main body portion 10, a head 14, a two-piece yoke 20, three engaging members 30, and enclosing can 40. The chuck also has an intermediate plate 50. In operation, engaging members 30 are through channels 18 in head 14 and yoke 20 encloses engaging members 30 so that first coarse thread 32 on engaging member 30 intermeshes with second coarse thread 22 on yoke 20 to form a first threaded screw system. Yoke 20 is supported, in part, by shoulder ridge 12 which is part of body 10. Yoke 20 is surrounded by can or enclosing member 40. First fine thread 24, which is located on the exterior surface of yoke 20, intermeshes with second fine thread 44, located on the interior surface of can 40 to form a second threaded screw system.

Yoke 20 includes a first set of interlocking members 26 on its surface closest to head 14 and head 14 has a second set of interlocking members 16 on its surface closest to yoke 20.

The operation of the drill chuck and the efficacy of the present invention are better explained by turning to FIGS. 2 and 3. A cutting implement such as a drill bit with a shaft 100 is placed between engaging members 30 when the drill chuck is in a loosened position. Can 40 of the drill chuck is turned so that engaging members 30 are driven up passages 18 to engage shaft 100. More particularly, coarse threads 22 on yoke 20 are pitched so that upon turning can 40 and, consequently, yoke 20, engaging members 30 ride up the threaded system and are directed inward towards shaft 100. Engaging surfaces 35 of engaging members 30 then contact shaft 100 of the drill bit. This contact, which holds the bit in place, is the pinching or loose tightening of the chuck. At the pinching stage, the frictional forces and the low mechanical advantage of coarse threads 22 and 32 make it difficult to further tighten the drill chuck by hand without using the greater mechanical advantage of fine threads 24 and 44. FIG. 2 illustrates a drill chuck in this pinching configuration.

FIG. 3 illustrates the drill chuck of FIG. 2 in the locked, clamped position. Upon restricted turning of coarse threads 22 and 32, the fine thread mechanism, formed of fine threads 24 and 44, takes effect because of the inherent greater mechanical advantage of the fine thread system relative to the coarse threaded system. The action of the fine thread system pushes yoke 20 and engaging members 30 upward and inward toward shaft 100, providing more and tighter surface contact and, consequently, more friction between engaging members 30 and shaft 100. This locks engaging members 30 about shaft 100.

When yoke 20 is pushed upward by the action of the fine thread mechanism, the first set of interlocking members 26 on yoke 20 engage second set of interlocking members 16 on head 14. In the interlocked position, yoke 20 and head 14 cannot turn relative to one another. To loosen the drill chuck after use so as to release or change the drill bit, can 40 is turned in the opposite direction which activates the fine thread mechanism 24 and 44, thereby allowing yoke 20 to be lowered from head 14. Interlocking members 16 and 26 are constructed such that fine threads 24 and 44 must be unscrewed, releasing the engagement of interlocking members 16 and 26, before the coarse thread mechanism 22 and 32 can operate. If interlocking members 16 and 26 were missing from this configuration, coarse threads 22 and 32 could turn prior to loosening of fine threads 24 and 44. Without interlocking members 16 and 26, fine threads 24 and 44 would be in the upright position at all times after several uses and the fine thread mechanism could not assist in clamping shaft 100 in place. The purpose of intermediate plate 50 is to form a base against which can 40 bears against while pushing yoke 20 upward into the locked position.

Figure 4:
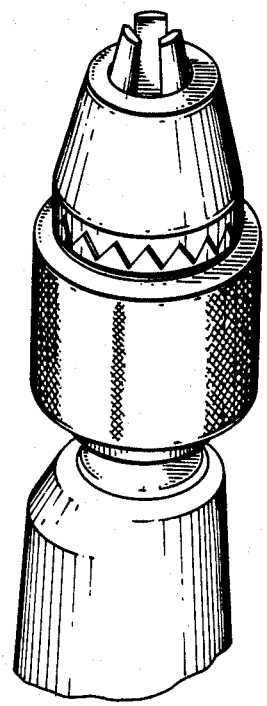
FIG. 4 is an external illustration of the drill chuck of FIG. 1.

FIG. 4 shows the external configuration of the chuck of FIGS. 1-3. This Figure illustrates a preferred mode of the inventi n, having three engaging members 30.

Figure 5:
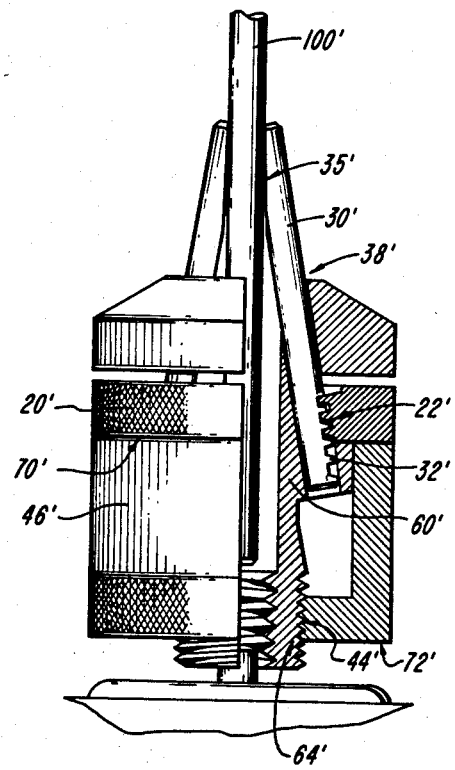
FIG. 5 is a cross sectional illustration of a different embodiment of the invention, a drill chuck having two separate turning surfaces.

FIG. 5 illustrates an alternate configuration of the drill chuck shown in FIGS. 1-4. In this embodiment, the shaft 100' of a drill bit is placed between engaging surfaces 35' of engaging members 30'. Engaging members 30' have a first set of coarse threads 32' on second surface 38', opposite engaging surface 35'. Yoke 20' has a second set of coarse threads 22' on its surface closest to engaging members 30'. First and second sets of coarse threads 22' and 32' engage to form the first threaded screw system. The drill chuck also has a central body 60' which includes a plurality of channels allowing passage of the engaging members 30' therethrough. Central body 60' is enclosed, in part, by an enclosing member 46'. Enclosing member 46' has an upper end 70' which abuts yoke 20'. There is a first set of fine threads 44' at the opposite end 72' of enclosing member 46'. A second set of fine threads 64' is located on central body 60' so that first and second sets of fine threads 64' and 44' form the second threaded screw system.

In operation, shaft 100' is placed between engaging surfaces 35' of engaging members 30' and yoke 20' is turned. Turning yoke 20' drives engaging surfaces 35' upward and inward, pinching shaft 100. When no further tightening is possible using the first threaded screw system, that is, when yoke 20' can no longer be turned by hand, enclosing member 46' is turned which engages the second threaded screw system. The upward action of the second threaded screw system causes yoke 20' to be pushed upward, clamping engaging members 30' about shaft 100' and partially disengaging first and second sets of coarse threads 22' and 32'.

The use of drill chucks or other apparatus for holding cutting implements which fall within the scope of the invention are advantageous for a number of reasons. First, the same degree of tightness is achieved by hand as formally was available only through the use of an additional mechanical device such as a key. Second, because no lever is necessary for tightening, the keyhole and keyway are unnecessary enabling the use of thinner heads on the drill chuck. Thinner heads allow access of the drill into places which would not otherwise be attainable.

Others skilled in the art may determine other modifications and variations of the apparatus and method disclosed herein which fall within the spirit and scope of the invention. Such other modifications and variations are included within the following claims.

What is claimed is:

1. A nonprecision apparatus for holding a cutting implement in a fixed position relative to a drive means, said apparatus comprising:
   A. a clamping member adapted to engage said cutting implement and hold it in a fixed position upon tightening, said clamping member having i. a plurality of engaging members each having a first surface adapted to engage said cutting implement upon pinching of said clamping member and a second surface having a first set of substantially coarse threads thereon, ii. a two-piece yoke having interior and exterior surfaces, said yoke having a second set of substantially coarse threads located on its interior surface and a first set of substantially fine threads located on its exterior surface, and iii. an enclosing member exterior to said yoke and having interior and exterior surfaces, said enclosing member having a second set of substantially fine threads on its interior surface;

B. a first threaded screw means which pinches said clamping member about said cutting implement; and C. a second threaded screw means which clamps said clamping member about said cutting implement; whereby turning said enclosing member imparts two separate, sequential actions; the pinching of said engaging members about said cutting implement by the action of said first threaded screw means automatically followed by the clamping of said engaging members about said cutting implement by the action of said second threaded screw means as the turning of said enclosing member continues until completion.

2. An apparatus according to claim 1 further comprising a head member having a plurality of channels each of which permits passage of one of said engaging members therethrough, said head member also comprising a first set of interlocking members located on its edge near said yoke and said yoke further comprises a second set of interlocking members on its edge nearest said head, whereby said first and second sets of interlocking members are engaged after pinching and prior to the onset of clamping of said cutting implement by said clamping member.

3. An apparatus according to claim 1 wherein said apparatus comprises a drill chuck.

4. A drill chuck for holding a drill bit in a fixed position relative to a drive means, said drill chuck comprising:

A. a plurality of engaging members adapted to engage said drill bit and hold it in a fixed position upon tightening;

B. a first threaded screw means which pinches said plurality of engaging members about said drill bit;

C. a second threaded screw means which clamps said plurality of engaging members about said drill bit;

D. said plurality of engaging members each having a first surface adapted to engage said drill bit during pinching of said drill bit and a second surface having a first set of substantially coarse threads thereon;

E. a two-piece yoke having interior and exterior surfaces, said yoke having a second set of substantially coarse threads located on its interior surface which intermesh with said first set of substantially coarse threads to form said first threaded screw means;

F. an enclosing member having interior and exterior surfaces and two ends, a first end positioned adjacent to said yoke and second end positioned away from said yoke, said enclosing member having a first set of substantially fine threads located on its interior surface at said second end;

G. a central body which includes a plurality of channels for passage of said engaging members, said central body further including a second set of substantially fine threads located to engage said first set of substantially fine threads to form said second threaded screw means; whereby the clamping of said engaging members about said drill bit is provided by the turning of said enclosing member thereby clamping said engaging members about said drill bit by hand without need of an additional mechanical device.

5. A method of tightening a drill chuck about a cutting implement entirely by hand comprising the steps of:

A. providing a drill chuck comprising:

1. a plurality of engaging members each having a drive surface and an engaging surface, said drive surface having a first set of substantially coarse threads thereon, 2. a yoke having an interior surface and an exterior surface, said yoke having a second set of substantially coarse threads on its interior surface located to intermesh with said first set of substantially coarse threads to form a first tightening means, said yoke also having a first set of substantially fine threads on its exterior surface and a first set of interlocking members, 3. an enclosing member having interior and exterior surfaces adapted to enclose said yoke, said enclosing member having a second set of substantially fine threads on its interior surface located to intermesh with said first set of substantially fine threads to form a second tightening means, and 4. a head member having a second set of interlocking members which engage said first set of interlocking members upon tightening of said drill chuck;

B. inserting a cutting implement between said plurality of engaging members;

C. turning said enclosing member to impart two separate, sequential actions; the pinching of said engaging members about said cutting implement by the action of said first threaded screw means automatically followed by the clamping of said engaging members about said cutting implement by the action of said second threaded screw means as the turning of said enclosing member continues until completion.

6. A method according to claim 5 whereby the action of said second tightening system partially disengages the threads of said first tightening system during clamping.

7. A method of tightening a drill chuck about a cutting implement entirely by hand comprising the steps of:

A. providing a drill chuck comprising:

1. a plurality of engaging members each having a first surface adapted to engage said drill bit during pinching of said clamping member about said bit and a second surface having a first set of substantially coarse threads thereon, 2. a yoke having interior and exterior surfaces, said yoke having a second set of substantially coarse threads located on its interior surface adapted to intermesh with said first set of substantially coarse threads to form a first threaded screw means, 3. an enclosed member having interior and exterior surfaces and two ends, a first end positioned adjacent to said yoke and a second end positioned away from said yoke, said enclosing member having a first fine thread on its interior surface at said second end, and 4. a central body including a plurality of channels for passage of said engaging members, said central body including a second fine thread located to engage said first fine thread to form a second threaded screw means;

B. inserting a cutting implement between said plurality of engaging members;

C. turning said yoke to pinch said engaging members about said cutting implement; and D. turning said enclosing member thereby clamping said engaging members about said cutting implement.

8. A method according to claim 7 whereby the action of said second tightening system forces said yoke towards said head member, thereby partially separating said first set of substantially coarse threads from said second set of substantially coarse threads.

9. A method according to claim 7 wherein the said tightening comprises at least two separate actions, the pinching of said bit by said drill chuck with a turning movement of said yoke, and the clamping of said bit by said drill chuck with an upward action of said yoke resulting in an upward and inward movement of said engaging members.

* * * * *

UNITED STATES PATENT AND TRADEMARK OFFICE
CERTIFICATE OF CORRECTION

PATENT NO. : 4,660,841
DATED : April 28, 1987
INVENTOR(S) : Michael J. Chouinard It is certified that error appears in the above-identified patent and that said Letters Patent is hereby corrected as shown below:

At Column 1, line 10 delete "devise" and insert --device--.

At Column 6, line 12 delete "inventi n" and insert

--invention--.

Signed and Sealed this

Twenty-fifth Day of August, 1987

*Attest:*

DONALD J. QUIGG

*Attesting Officer*     *Commissioner of Patents and Trademarks*